B. LYON.
Revolving Harrow.
No. 82,623. Patented Sept. 29, 1868.
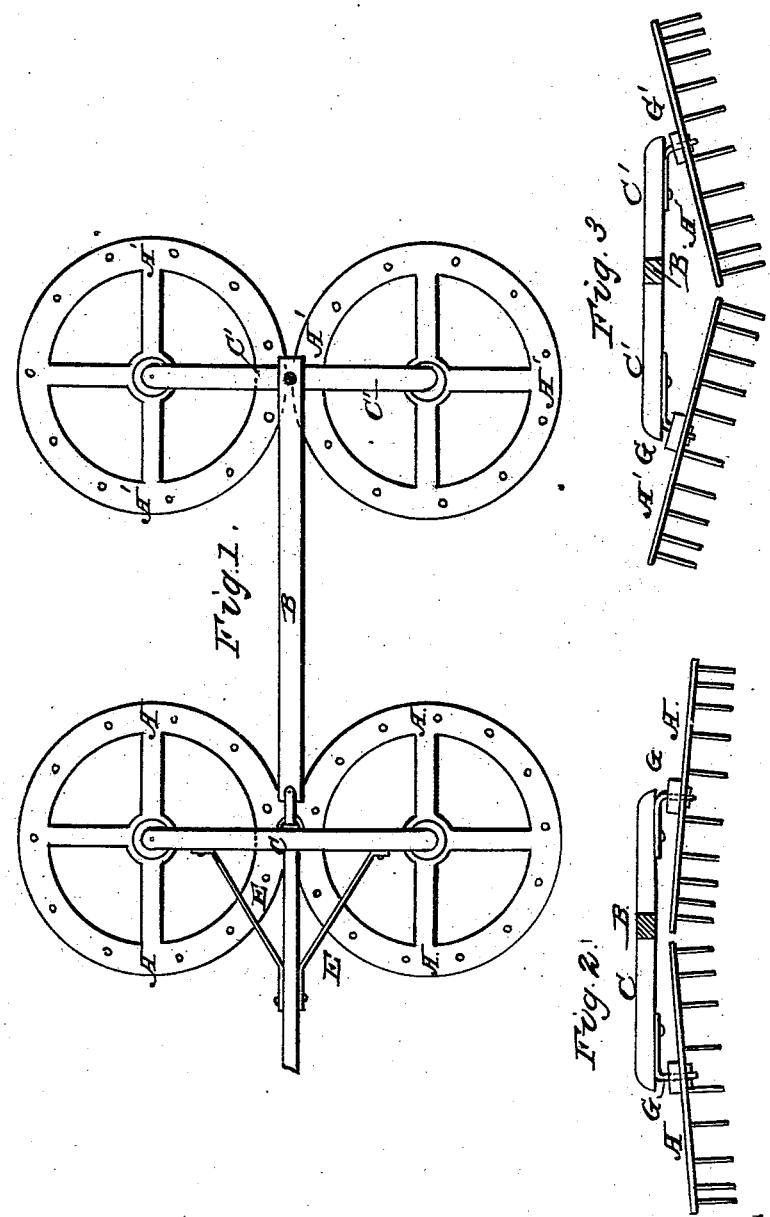
Inventor
Barton Lyons

United States Patent Office.

BAXTER LYON, OF MOUNT PLEASANT, ILLINOIS, ASSIGNOR TO HIMSELF AND DANA L. COHEMBIA.

*Letters Patent No. 82,623, dated September 29, 1868.*

IMPROVEMENT IN REVOLVING HARROW.

*The Schedule referred to in these Letters Patent and making part of the same.*

TO ALL WHOM IT MAY CONCERN:

Be it known that I, BAXTER LYON, of Mount Pleasant, in the county of Whitesides, and State of Illinois, have invented a new and useful Revolving Harrow; and I do hereby declare that the following is a full, clear, and exact description of the same, reference being had to the annexed drawings, making part of this specification.

This invention relates to an improvement in revolving harrows, and it consists in the arrangement of two pairs of revolving toothed wheels, connected together in such a manner that the rear pair follow nearly in the path of the leading or forward pair; and the invention consists in the arrangement of these wheels, with reference to each other, so that the leading pair shall have an inclination outwards and downwards from a line drawn through the centre of the bolsters, which support them in the direction of the movement of the harrow, and so that the rear pair shall have an inclination inwards and downwards with reference to said line.

Figure 1 is a top view of the harrow complete.

Figure 2 is a sectional view on the line $x\,x$ of fig. 1 of the leading pair of wheels, showing the position they assume when in use; and Figure 3 is a sectional view of the rear or following pair on the same line, showing the position which they occupy with reference to the leading pin.

Similar letters denote corresponding parts in the several figures.

A A are revolving toothed wheels, arranged side by side, having the axis upon which they rotate fastened to the bolster C, and so arranged with reference thereto as to compel them to assume the position shown in fig. 2 of the drawings.

A' A' are the second pair of toothed wheels, with their axis fastened to the bolster C', and so arranged as to cause the wheels to assume the position shown in fig. 3 of the drawings.

B is a reach, extending from the front to the rear bolster, for the purpose of connecting the rear pair of wheels to the forward ones. This reach is fastened permanently to the bolster of the rear pair of wheels; but at its front end, where it connects with the bolster upon the front wheels, it carries a clevis-wheel, which is attached to and works within a staple secured to said bolster; the object of the last-named arrangement being to permit the harrow to be turned around the corners of the field with facility, or to be propelled in a circle if necessary.

C is a bolster, extending from centre to centre of the front revolving wheels, and to which is fastened the axis G of such wheels.

C' is the bolster, carrying the axis of the rear revolving wheels, which is arranged in all respects like the one above described, except that the axes of the wheels are so arranged as to give a reverse inclination to the revolving wheels.

D is the tongue or pole to which the animals are attached for propelling the harrow.

E E are braces for securing the pole to the bolster, to each of which they are fastened with bolts in the usual manner.

G G and G' G' are straps of metal fastened to the bolsters, and upon which are made or secured the axis upon which the wheels A A and A' A' revolve. As before stated, the axes of the leading pair of wheels are so set with reference to each other that the inner edges of the revolving wheels, as they rotate, are considerably higher than their outer edges, while those of the rear wheels are the reverse of those of the leading ones, or are so set with reference to the bolster that the outer edges of the wheels, as they rotate, are considerably higher than their inner edges.

It will be seen from the foregoing description that, as a consequence of the arrangement of the two pairs of revolving wheels, I am enabled to construct a harrow which more thoroughly mixes and pulverizes the ground than any now in use. The above-described result arises from the fact that after the first pair of wheels pass over any one part, they have a tendency to leave the earth higher in the centre of their line of progressive motion than at the sides thereof, thus leaving it in the best possible position for the spreading action of the rear wheels consequent upon their different position upon their axis of rotation.

Thus it will be seen that while the revolving harrow, as usually constructed, acts upon the earth only through the rotary motion given to it by propelling it forward, mine has the additional merit of giving two sidewise movements to the earth, and finally leaves it in far better condition, so far as evenness of surface is concerned, than the ordinary kind of harrows.

I am aware that two pairs of revolving wheels, the one following the other, as in my case, have before been used, and hence I do not claim broadly such arrangement; but

What I claim as my invention, and desire to secure by Letters Patent, is—

A revolving harrow, the front and rear portions of which being constructed substantially as described, are connected to each other by a jointed or flexible connection, as and for the purpose described.

In testimony whereof, I have signed my name to this specification in the presence of two subscribing witnesses.

BAXTER LYON.

Witnesses:
  O. F. WOODRUFF,
  GEO. H. FAY.